US009305356B2

(12) United States Patent
Mohr et al.

(10) Patent No.: US 9,305,356 B2
(45) Date of Patent: Apr. 5, 2016

(54) IMAGE PROCESSING METHOD AND APPARATUS

(75) Inventors: Brian Mohr, Edinburgh (GB); Marco Razeto, Edinburgh (GB); Jim Piper, Edinburgh (GB)

(73) Assignees: KABUSHIKI KAISHA TOSHIBA, Tokyo (JP); TOSHIBA MEDICAL SYSTEMS CORPORATION, Otawara-shi (JP)

( * ) Notice: Subject to any disclaimer, the term of this patent is extended or adjusted under 35 U.S.C. 154(b) by 250 days.

(21) Appl. No.: 13/036,418

(22) Filed: Feb. 28, 2011

(65) Prior Publication Data
US 2012/0219198 A1 Aug. 30, 2012

(51) Int. Cl.
*G06K 9/00* (2006.01)
*G06T 7/00* (2006.01)

(52) U.S. Cl.
CPC .............. *G06T 7/0081* (2013.01); *G06T 7/0091* (2013.01); *G06T 2207/20141* (2013.01); *G06T 2207/30196* (2013.01)

(58) Field of Classification Search
USPC ......... 382/100, 128–132, 154, 170, 173, 190; 600/407, 410, 428, 431; 345/424; 378/16, 18, 37, 207; 250/370.13, 458.1
See application file for complete search history.

(56) References Cited

U.S. PATENT DOCUMENTS

| | | | |
|---|---|---|---|
| 7,359,572 B2 * | 4/2008 | Liu et al. ........................ 382/274 |
| 7,676,257 B2 * | 3/2010 | Suryanarayanan et al. .. 600/425 |
| 7,796,835 B2 * | 9/2010 | Matsumoto .................... 382/276 |
| 7,840,051 B2 * | 11/2010 | Razeto ......................... 382/131 |
| 8,036,435 B2 * | 10/2011 | Partain et al. ................. 382/128 |
| 2003/0223627 A1 * | 12/2003 | Yoshida et al. ............... 382/128 |
| 2004/0182991 A1 | 9/2004 | Sugita |
| 2004/0184647 A1 * | 9/2004 | Reeves .................. G06T 3/0075 382/131 |
| 2005/0180613 A1 * | 8/2005 | Bronstein .......... G06K 9/00214 382/118 |
| 2007/0161889 A1 * | 7/2007 | Mayer et al. .................. 600/410 |
| 2008/0117209 A1 * | 5/2008 | Razeto .......................... 345/424 |
| 2008/0292147 A1 * | 11/2008 | Bronstein ............... G06T 17/00 382/118 |
| 2009/0087058 A1 | 4/2009 | Ihara |
| 2009/0208082 A1 * | 8/2009 | Westerhoff et al. ........... 382/131 |
| 2009/0226060 A1 * | 9/2009 | Gering et al. ................. 382/128 |
| 2011/0158491 A1 * | 6/2011 | Markova et al. .............. 382/128 |

FOREIGN PATENT DOCUMENTS

| | | |
|---|---|---|
| JP | 2004-283281 | 10/2004 |
| JP | 2009-082463 | 4/2009 |
| JP | 2010-172515 | 8/2010 |

OTHER PUBLICATIONS

K. Passera, et al., "A Non-Linear Registration Method for DCE-MRI and DCE-CT Comparison in Bladder Tumors", 5th IEEE International Symposium on Biomedical Imaging: From Nano to Macro, ISBI 2008, May 14-17, 2008, pp. 1095-1098.
Jean Paul Serra, "Image Analysis and Mathematical Morphology", ISBN 0126372403, 1982, 32 pages.
Japanese Office Action issued in corresponding Japanese Patent Application no. 2012-042485 mailed Jan. 19, 2016.

* cited by examiner

*Primary Examiner* — Hadi Akhavannik
(74) *Attorney, Agent, or Firm* — Oblon, McClelland, Maier & Neustadt, L.L.P

(57) ABSTRACT

A method of selecting image data representative of a subject from an image data set comprises determining regions of image data, wherein each region of image data consists of a respective plurality of connected voxels, and selecting at least one region as being representative of the subject based upon at least one of the size and shape of the region.

39 Claims, 11 Drawing Sheets

IMAGE PROCESSING METHOD AND APPARATUS

FIELD

Embodiments described herein relate generally to a method and apparatus for processing image data, for example volumetric image data, to identify and extract image data representative of a patient or other subject.

BACKGROUND

Modern three-dimensional imaging techniques, such as for example computerised tomography (CT) or magnetic resonance imaging (MRI), have the ability to produce volumetric representations of anatomy allowing users to examine acquired data retrospectively or under live screening from any plane and to apply image processing techniques to achieve accurate viewing of individual structures.

Such three-dimensional techniques produce large three-dimensional volume data sets comprising a three-dimensional array of voxels each representing a property of a corresponding measurement volume. In the case of CT data sets, each voxel usually represents the attenuation of X-ray radiation by a respective, corresponding measurement volume.

Usually each volume data set will contain data representative of various features that are extraneous to the patient or the subject under consideration, for example data representative of a table on which the patient is positioned whilst measurements are performed. The presence of data extraneous to the patient or other subject under consideration can interfere with subsequent algorithms or processes that are applied to the data.

For example, there are situations where a fully rotatable volume rendered view of a portion of a patient's anatomy is the most useful representation of the pathology, rather than a traditional radiological slab. A wide variety of such volume rendered views can be used for different purposes, for example as angiography presets. The volume rendered views may be based, for example, on volumetric MIPs. Since in many cases routine anatomy may interfere with viewing of the volume rendered anatomy, a facility may be needed to eliminate from view such extraneous portions of the patient. Furthermore, when viewing a 3D volume rendered view there are situations where the CT table is included in the scanned field of view and must be removed in order to visualize the underlying anatomy. In some systems, the user is required to manually select and delete the table from the visual representation of the 3D volume, piece by piece. It can be difficult to select only the table for deletion, without the selection encompassing the surrounding tissues. This process can be time consuming and require more user interaction than is desirable, particularly as a skilled person such as a radiologist is usually required to perform the manual selection.

It is also known to apply automatic registration or feature extraction procedures to identify and extract particular anatomical features. The presence of data representative of extraneous features can interfere with such procedures. The presence of image data representative of a table in CT studies can particularly influence registration or other image analysis procedures. The high-density portions of the table are highly uniform and thus tend to significantly affect the outcome of registration. Limiting registration to the domain of the body can improve results of the registration procedure. It may also improve bone segmentation and other algorithms. Therefore, it may be desirable to identify and extract data representative of a patient or other subject, and to discard data representative of extraneous features, before performing further processes.

A known technique for identifying and extracting data representative of a patient, and discarding data representative of a table, uses connected component analysis. At the first stage of the process expected intensity levels that may be obtained from a table and that may be obtained from a patient are each estimated. The estimates are then used to locate general areas in the image volume occupied by the table or occupied by the patient. Connected component analysis is then used to determine contiguous blocks of image data representative of the patient. The blocks of data representative of a patient, based upon intensity level, are retained and other data, such as data representative of the table, is suppressed.

The method described in the preceding paragraph relies on accurately selecting expected intensity levels both for a table or other extraneous feature and for a patient. A major issue with the method is that it assumes that there is an intensity threshold that separates the table from the body. Actual intensity levels for a particular table or patient often do not match expected levels, and thus data may be erroneously retained or discarded. In addition, there may well be further extraneous features such as clothing, head rests, pipes or tubing that may produce measurement intensities that do not match well with the expected intensities, again leading to data being erroneously discarded or retained.

In another known method, CT data representative of solid or liquid material is pre-selected based upon measured intensity levels, and data representative of air or other gas is discarded. Connected component analysis is used to identify different connected regions. Regions are then discarded as representing the CT table based upon their position in the volume. For example, if the patient was lying on a table located towards the bottom of a measurement volume then connected regions of the measurements data set corresponding to positions towards the bottom of the volume would be discarded. However, such methods rely on accurate knowledge of the position of the CT table relative to the measurement apparatus, which can vary from measurement to measurement. Furthermore, small inaccuracies of estimation of the position of the CT table can lead to data erroneously being retained or discarded. The failure rates of some such known methods have been estimated at around 60%.

BRIEF DESCRIPTION OF THE DRAWINGS

Embodiments are now described, by way of non-limiting example, and are illustrated in the following figures, in which:—

FIG. 6 is a 3-D volumetric representation of one of the data sets of FIGS. 5a to 5c after processing using the process of FIG. 2, showing identified patient and table regions.

DETAILED DESCRIPTION

According to one embodiment there is provided a method of selecting image data representative of a subject from an image data set comprising determining regions of image data, wherein each region of image data consists of a respective plurality of connected voxels, and selecting at least one region as being representative of the subject based upon at least one of the size and shape of the region.

Figure 1:
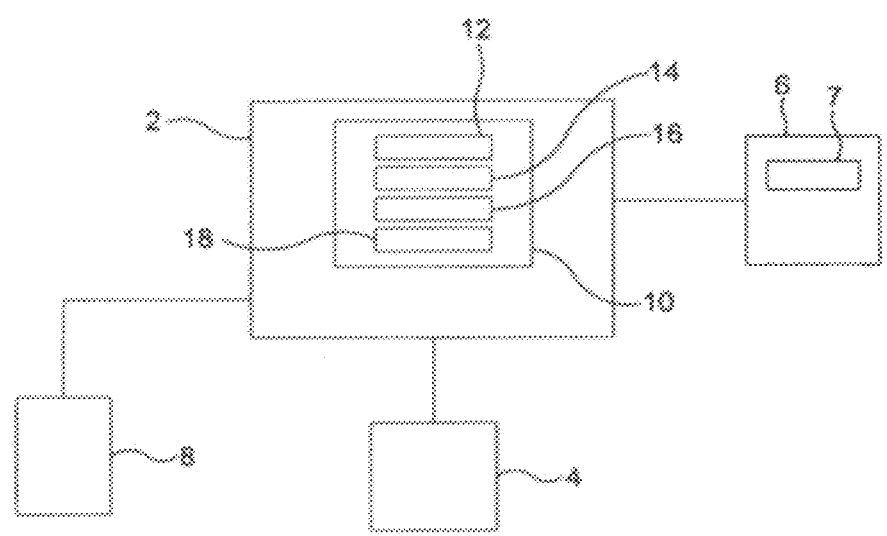
FIG. 1 is a schematic diagram of an image data processing system according to an embodiment.

An image processing apparatus according to an embodiment is illustrated schematically in FIG. 1 and is configured to implement the method described in the preceding paragraph. The apparatus comprises a processing apparatus 2, in this case a personal computer (PC) or workstation that is connected to a display device 4, a data store 6 and a user input device or devices 8, in this case a computer keyboard and mouse. Although user input devices are provided, once the data set on which the image processing is to be performed has been selected the selection of image data representative of a subject from the image data set is performed automatically, without requiring user input during the process.

The processing apparatus 2 provides a processing resource for automatically processing image data, and comprises a central processing unit (CPU) 10 that is operable to load and execute a variety of software modules or other software components that are configured to perform a method as described in detail below with reference to FIG. 2. The software modules include a connected component analysis module 12 for performing connected component analysis procedures, a thresholding module 14 for selecting voxels based on a comparison with an intensity threshold, a morphology module 16 for performing morphological operations, and a selection and fitting module 18. The processing apparatus 2 also includes a hard drive and other components of a PC including RAM, ROM, a data bus, an operating system including various device drivers, and hardware devices including a graphics card. Such components are not shown in FIG. 1 for clarity.

In the embodiment of FIG. 1 the processing apparatus 2 comprises an E5504 2.0 GHz chipset and 2×4 core processors, that provide a multi-threaded environment using 9 threads, and 6.0 Gbytes of RAM is provided. However, any suitable CPU and other components may be used.

The data store 6 includes a database that stores a large number of different data sets, for example volumetric data sets representative of three dimensional CT data obtained from CT measurements on patients. Any suitable CT measurement apparatus can be used to obtain the three dimensional CT data in accordance with known techniques. The data store 6 in the embodiment of FIG. 1 is a server that stores a large quantity of patient data, and may form part of a Picture Archiving and Communication System (PACS), for example the Toshiba Rapideye® system.

Figure 2:
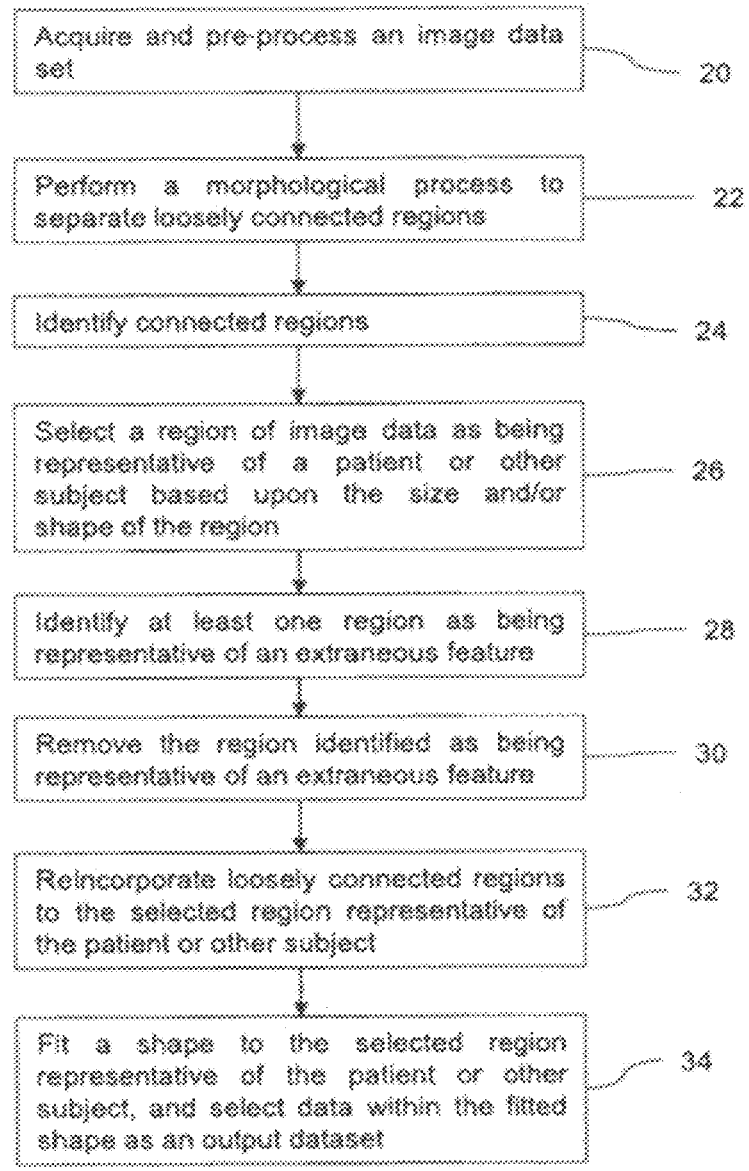
FIG. 2 is a flow chart illustrating in overview a process for identifying and extracting patient image data in an image data set performed by the system of FIG. 1.

The system of FIG. 1 is configured to perform a sequence of processes as illustrated in overview in the flow chart of FIG. 2. 3-D volume rendered views of the image data set, or parts of the image data set, at different stages of the procedure are provided in FIGS. 3a to 3j. It should be understood that the images are provided by way of illustration only and that, during usual operation of the process, 3-D volume rendered views would not be generated at each stage.

In the first stage 20 of the process operation a selected CT image data set 7 is downloaded from the server 6 to the processing apparatus for processing. In an alternative embodiment or mode of operation, the CT image data is obtained by the processing apparatus 2 directly from a CT measurement apparatus (not shown) rather than from the data store 6. In such embodiments the processing apparatus may form part of the control system of the CT measurement apparatus. In other embodiments, the data set 7 is stored in memory of the processing apparatus 2 rather then being downloaded from the server 6.

Figure 3A:
FIGS. 3a to 3j are 3-D volumetric representations of the image data set at various stages during the process of FIG. 2.

A 3-D volume rendered view of the CT image data set before processing is shown in FIG. 3a.

The data set comprises a plurality of voxels each corresponding to a different spatial location. The value, or intensity, of each voxel is representative of the amount of absorption of x-ray radiation at that spatial location. The amount of absorption of x-ray radiation is calibrated according to the Hounsfield scale. On that scale, air has a value of around −1000 Hounsfield units (HU), whereas body fat has a value of around −30 HU, water has a defined value of 0 HU, soft tissue has a value of around +40 HU and bone has a value of around +1000 HU. The amount of absorption of x-ray radiation provided by a voxel according to the Hounsfield scale can also be referred to as the CT number for that voxel.

The data processing apparatus 2 stores a threshold intensity value in memory. After downloading of the data set, each voxel of the data set is compared to the threshold intensity value and those voxels that have a value less than the threshold intensity value are discarded. Any suitable threshold value can be used, although it has been found to be useful to use a threshold value between −200 HU and −600 HU. In the embodiment of FIG. 1, the threshold intensity value is set at −300 HU which results in those voxels representative of bone, tissue or other solid material such as the frame of the gantry or other table being retained. Voxels representative of air or other gas are discarded. In practice, extraneous components such as a table or headrest usually include large parts that are made of foam or other light-weight material. It has been found that such voxels are usually also discarded by the initial thresholding, leaving voxels representative of only solid frame components of the table or headrest.

When reference is made to a voxel or other data item being discarded, removed or excluded from the data set, the voxel or other data item is not usually deleted from the data set (although in some embodiments it may be deleted). Instead, the voxel or other data item is usually flagged within the data set as having been discarded, removed or excluded and thus may be ignored during at least some, or all, further processing stages.

Figure 3B:

A 3-D volume rendered view of the CT image data set after the discarding of voxels below the intensity threshold is shown in FIG. 3b. It can be seen that the appearance of the image in FIG. 3b is essentially the same as the appearance of the image in FIG. 3a, as the voxels with intensities below the threshold made little if any contribution to the image.

Next, at stage 22, a morphological process is performed on the remaining voxels. The morphological process comprises a morphological opening process that effectively discards connected regions that are below a threshold thickness. The morphological opening process is a known process that comprises erosion followed by dilation steps, as illustrated schematically in FIG. 4 by way of example for two loosely connected regions 70, 72. Any suitable known morphological process can be used. Background information, and examples of morphological processes, can be found in *Image Analysis and Mathematical Morphology* by Jean Serra, ISBN 0126372403 (1982).

Figure 4:
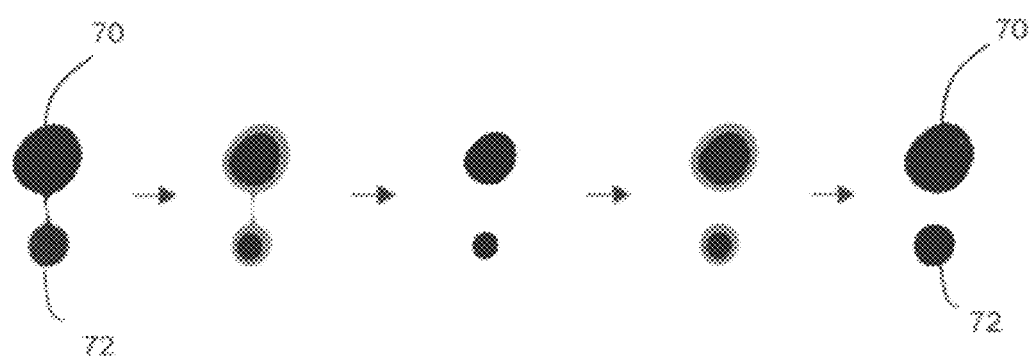
FIG. 4 is a schematic illustration of a morphological opening process comprising erosion and dilation performed on two loosely connected regions.

It can be seen from FIG. 4 that the morphological opening process has the effect of separating loosely connected regions. In the embodiment of FIG. 1 applied to CT image data of a patient, the morphological opening process can have the effect of separating a patient region from a table region when the two are loosely connected. The morphological process can also have the side-effect of removing thin structures such as the tip of a nose or ears.

In fact, in the case of some CT tables, where the bulk of the table is formed of foam or other non-absorbing material, voxels representative of the foam or other non-absorbing material are discarded during the initial thresholding process and only voxels representative of a metal or other frame of the table are retained. For such CT tables, the patient region will be separate from the table region even without the morphological process. However, as it is not known in advance the construction of the table the morphological process is usually applied to all data sets.

After the morphological process has been performed, the data set usually comprises a separate set of regions, each comprising a plurality of connected voxels above the threshold intensity value. The regions represent, variously, the patient, the table or parts of the table, and any other extraneous features that are present.

At the next stage of the procedure 24, a connected component analysis process is applied to the remaining voxels (those voxels which have an intensity value above the threshold). The connected component analysis process identifies each of the clusters of inter-connected voxels as separate regions. Any suitable known connected component analysis process may be used to identify the regions of connected voxels.

A voxel may be considered to be connected to another voxel if it is adjacent to that other voxel. In some embodiments adjacent voxels may be only those voxels whose faces are adjacent (in which case a particular voxel may be adjacent to a maximum of 6 other voxels). In other embodiments adjacent voxels may be only those voxels whose faces or edges are adjacent (in which case a particular voxel may be adjacent to a maximum of 18 other voxels). In still other embodiments adjacent voxels may be those voxels whose faces, edges or corner points are adjacent (in which case a particular voxel may be adjacent to a maximum of 22 of other voxels). It will be understood that an adjacent voxel may be adjacent to one or more further voxels, and thus a connected region may be of any shape or size up to the maximum size of the data set. In the process of FIG. 2 a connected region identified at stage 22 could only be of the maximum size of the data set if all voxels in the data set were above the threshold. At the next stage 26 of the process a region of image data is selected as being representative of the patient based upon the size of the region. In one mode of operation the largest single region is selected as being representative of the patient.

Figure 3C:
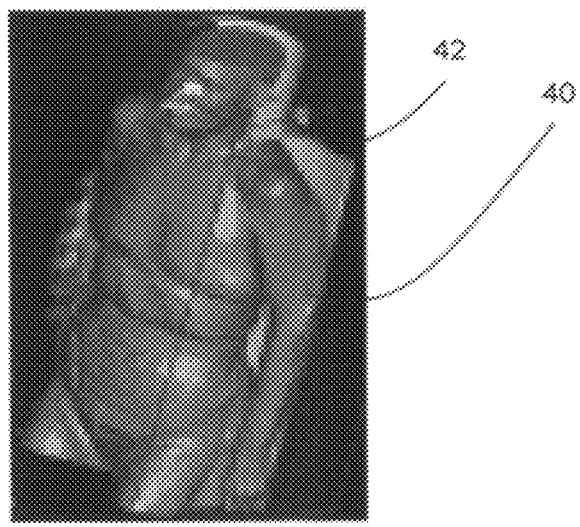

A 3-D volume rendered view of the CT image data set after the selection the patient region at stage 26 is shown in FIG. 3c. The selected patient region 40 and the other regions 42 are both shown in FIG. 3c.

In another mode of operation a region or regions are selected as being representative of the patient if the region or regions have a fractional volume above a predetermined threshold, for instance a fractional volume above 0.25. In this case the fractional volume of a region is the number of above-threshold voxels in the region divided by the number of above-threshold voxels in the data set. The selection of a suitable threshold value, for example 0.25, can ensure that if, for example, an image data set includes data representative of two legs but does not include data representative of the torso to which each leg is attached then regions representing each leg will be identified as being representative of the body.

The use of a simple measure of shape or size of the region, for example a measure based on comparison of the shape or size of the region to other regions, or to a threshold value, has been found to be a quick and computationally simple approach to automatically determining which region or regions are representative of the patient. The approach takes advantage of the fact that the shape and/or size characteristics of the patient are usually different to those of extraneous objects such as tables. For example table components are usually smaller and/or have a higher ratio of perimeter to filled interior size.

At the next stage 28 of the procedure, the regions identified as being representative of the patient are selected out, leaving those regions that are above the intensity threshold but that have not been identified as representing the patient. A further process is then performed to identify which, if any, of the remaining regions represent the table. That further process uses a geometrical classifier to identify regions that may represent the table or parts of the table.

The geometrical classifier process comprises, for each of the remaining regions, identifying the centre point of the region. A transverse or axial slice is then taken through the centre point. The cross-sectional area (A) and the perimeter (p) of the slice is calculated. In this case, the perimeter, p is defined as the sum of the maximum extent along the X and Y axes. The X and Y axes are orthogonal axes in the plane of the axial slice. The cross-sectional area is the cross-sectional area represented by the above-threshold voxels of the slice, the below-threshold voxels having already been discarded. The value of the geometrical classifier, C, for the region is calculated as being $C=\sqrt{A}/p$.

Any region with C<0.15 is then identified as being representative of the table. That classification exploits the fact that the CT table is usually hollow and that the table, or parts of the table, generally have a large perimeter when compared with a human or animal body, even smaller regions of a human body such as fingers. The geometrical classifier, C, is dimensionless and thus invariant to scale. In work on sample datasets, it has been found that table features generally produce values of C around 0.1, whereas a patient produces values of C around 0.2 to 0.25. Thus, a threshold value of 0.15 can distinguish between table and patient features.

In alternative embodiments, several axial slices are taken through each region and a value of C is calculated for each slice. The value of C for each slice is used in the identification of the table region, for example in some embodiments the values of C for the different slices of the same region are averaged and then compared to the threshold.

Although the particular geometrical classifier mentioned above has been found to be particularly useful in other embodiments, different geometrical classifiers are used to distinguish the table region, for example $C=A/p^2$. Any suitable geometrical classifier that can distinguish between a subject, such as a patient, and extraneous objects may be used. A suitable threshold value can be selected for each suitable classifier in order to distinguish between a subjects and extraneous objects.

In a further alternative embodiment, the whole volume of a region is considered in order to determine a value of a geometrical classifier. For example, the value of the geometrical classifier may be determined based on the volume of the region and the surface area of the whole region. For example, the value of the geometrical classifier may be equal to the volume squared divided by the surface area cubed. A suitable threshold value can again be used to distinguish a table region from other regions.

Figure 3D:
Figure 3E:

3-D volume rendered views of the CT image data set are shown in FIGS. 3d and 3e in which different regions identified as being associated with the table at stage 28 are highlighted. FIG. 3d highlights an identified region 44 of the table located beneath the patient's back and FIG. 3e highlights a headrest region 46 identified at stage 28. The patient region identified at stage 26 is also shown in FIGS. 3d and 3c for the purposes of illustration.

The approach taken at stage 28 takes advantage of the fact that measurement table components have been found usually to be smaller and/or have a higher ratio of perimeter to filled interior size than a human or animal body or other subject. Even in the case of a relatively large table, the only above-threshold voxels may be present in the frame of the table, and the interior of the table will usually comprise below-threshold voxels that will have been discarded at the start of the process. Thus, the measure of the filled volume or area of the table (for example, the number of above-threshold voxels included in the table region) will usually be low relative to the measure of the perimeter. In some cases, once the below-threshold voxels have been discarded the frame of the table will comprise a plurality of separate regions (for example a plurality of separate rod shapes). Even in those cases, it has been found that the measure of the filled volume or area of each region is low relative to the measure of the perimeter of the region, in comparison to the whole or even individual parts (for example tip of nose, ears, fingertips) of a human or animal body.

All regions identified as being representative of the table using the geometrical classifier are then removed at stage 30, leaving only those above-threshold regions that are not identified as being either patient or table.

Figure 3F:
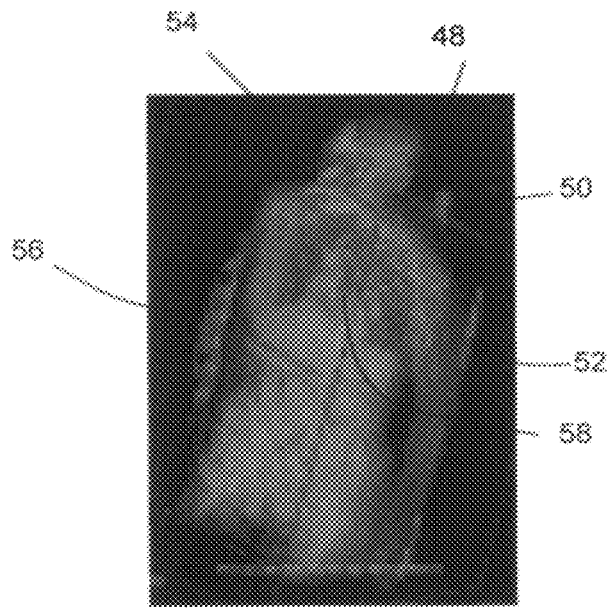

A 3-D volume rendered view of the CT image data set after stage 30 is shown in FIG. 3f and various above-threshold regions 48, 50, 52, 54, 56, 58, 60 that were not identified as being either patient or table are shown. By way of example, region 48 corresponds to the patient's ear, and region 54 corresponds to the patient's nose. The patient region identified at stage 26 is also shown in FIG. 3f for the purposes of illustration.

A connected component analysis procedure is then used at stage 32 to determine which, if any, of those remaining above-threshold regions touch the region identified as being representative of the patient and do not touch the region or regions identified as being representative of the table. Any such remaining above-threshold regions that touch the patient but do not touch the table are then added to the region or regions identified as being representative of the patient. That process has the effect of re-incorporating narrow or loosely connected regions, such as the tip of the nose or the ears of fingertips, which may have been separated or removed during the morphological opening process. The determination of which above-threshold regions touch the patient region or regions and do not touch the table region or regions is performed using the above threshold data set as it was before the morphological opening process was performed.

Figure 3G:
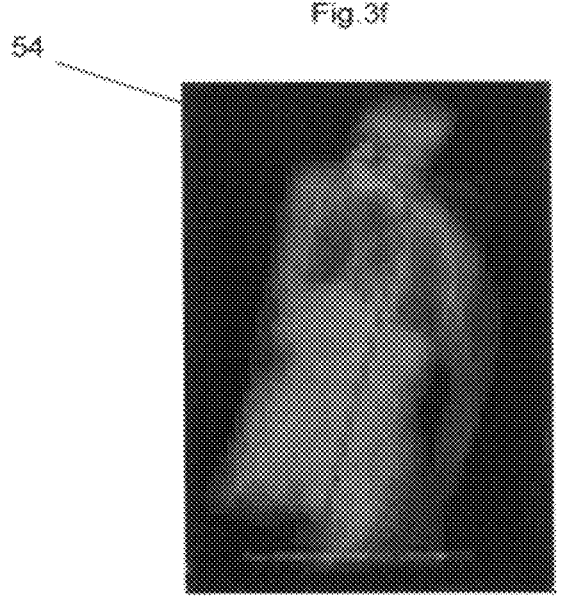

A 3-D volume rendered view of the CT image data set at stage 32 is shown in FIG. 3g in which one of the above-threshold regions 54 that is determined as touching the patient region is shown. In this case the above threshold region 54 corresponds to the patient's nose and is subsequently reincorporated into the patient region. Other above threshold regions may also be reincorporated into the patient region and region 54 is highlighted in FIG. 3g purely by way of example.

Figure 3H:

FIG. 3h is a 3-D volume rendered view of the CT image data set following stage 32, after reincorporation of the touching above-threshold regions to the patient region. The resulting patient region 60 shown together with the other regions 42.

Figure 3I:

At the next stage 34 of the process, each transverse slice of the region selected as being representative of the patient is replaced in turn by a fitted, simpler shape and all voxels from the original data set that fall within the fitted shape are selected for inclusion in an output domain. In the embodiment of FIG. 2, each transverse slice is replaced by its minimum enclosing convex polygon (convex hull). The minimum enclosing convex polygon is, by definition, non-concave. The resulting fitted set of convex hulls 62 is shown in FIG. 3i.

By using such a fit, it can be ensured that voxels representative of, for example, the inside of the mouth, the sinuses and the inside of the lungs will be included in the output data set even though such voxels will have been discarded during the initial thresholding procedure.

As an alternative to fitting to the convex shape, a fill can be performed but that may fail in some circumstances, or close may be performed but that is usually more computationally intensive than fitting to the minimum enclosing convex polygon.

The output domain comprises voxels representative of the patient or other subject and excludes substantially all voxels representative of the table or other extraneous objects. The output domain may comprise all of the voxels of the original data set, with the selected voxels flagged as being representative of the patient or other subject and/or with the non-selected voxels flagged as not being representative of the patient, thus enabling masking of the selected or non-selected voxels if so desired. Alternatively the output domain may comprise an output data set that comprises only the voxels selected as being part of the patient or other subject region.

Figure 3J:
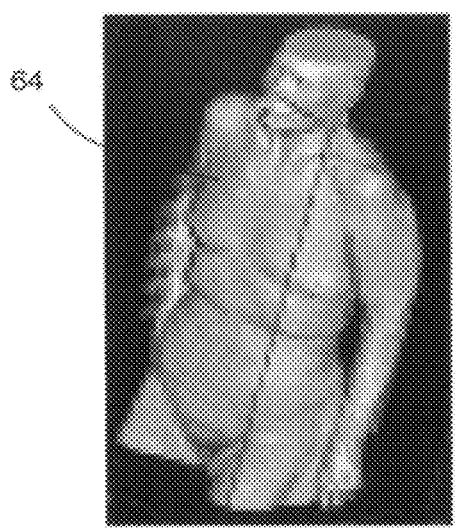

The output domain data can be stored by the processing apparatus 2, or can be returned to the server 6. The output domain data can also be passed to other image processing algorithms or systems, for example the Voxar 3D System®, for subsequent use in further image processing procedures. A 3-D image 64 of the output data set is shown in FIG. 3j.

In the embodiment described in relation to FIG. 2, the selection of the subject region at stage 26 is performed based on the size of the regions. In further, alternative embodiments a geometrical classifier can be determined for each region and the selection of the subject region at stage 26, for example a human or animal body, is based upon a comparison of the value of the geometrical classifier to a threshold. The geometrical classifier can be the same or similar to the geometrical classifier used for identification of the extraneous feature. The value of the threshold can be set at an appropriate level to distinguish the subject from other, extraneous features.

In the embodiment described in relation to FIG. 2, the subject of interest is a patient and the table is an extraneous feature to be excluded. In other embodiments, or modes of operation, the table is treated as the subject and the patient is treated as an extraneous feature. In such embodiments or modes of operation, data representative of the table is selected and data representative of the patient is discarded.

The method does not require the intensity of absorption of the patient or the subject or of the table or other extraneous objects to be estimated. The method also does not require properties of the table to be known and can be applied to any CT data set and any table arrangement. The method also ensures that voxels representative of other extraneous features in addition to the table will be discarded, even without prior knowledge of what other extraneous features may be present. The method is computationally simple, as it selects regions as being representative of the patient and/or table based on relatively simple measures of the shape or size of the regions. It has been found that in practice those measures are effective in distinguishing the patient or other subject and the table, and may also be combined with the morphological opening process which can provide for improved accuracy in some cases.

The method of the described embodiment goes beyond simple connected component analysis and separates the table and body in cases where they may be slightly connected. The method can be applied to any CT study and to other medical imaging data sets and is not directed only to CT angiography. The method identifies the body domain and is also able to remove spurious material other than the table. The method does not depend on anatomical region or range, does not depend on the resolution of the CT scanner of the measurement apparatus used, and does not depend on the table manufacturer or characteristics of any particular table. The method is invariant to variations in table size and shape and is based on only a few simple assumptions concerning table properties. The method does not require any input other than suitable image data, for example DICOM image data.

Experimental results obtained using the method of FIG. 2 are illustrated in FIGS. 5 to 7.

Figure 5A:
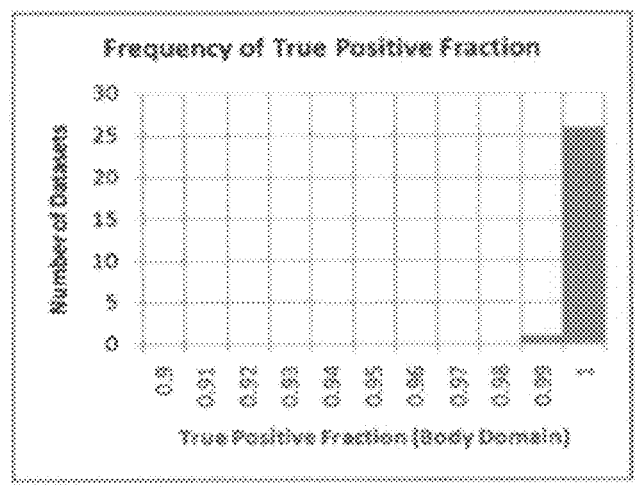
FIGS. 5a to 5c are graphs illustrating the outcome of the process of FIG. 2 performed on 27 different data sets.
Figure 5B:
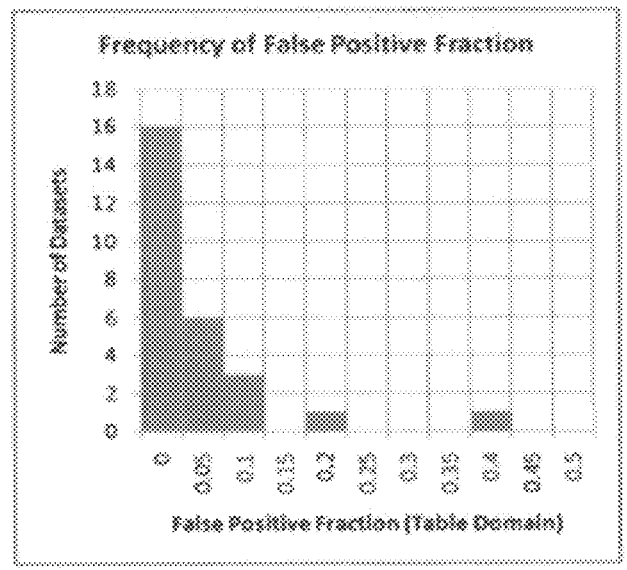
Figure 5C:
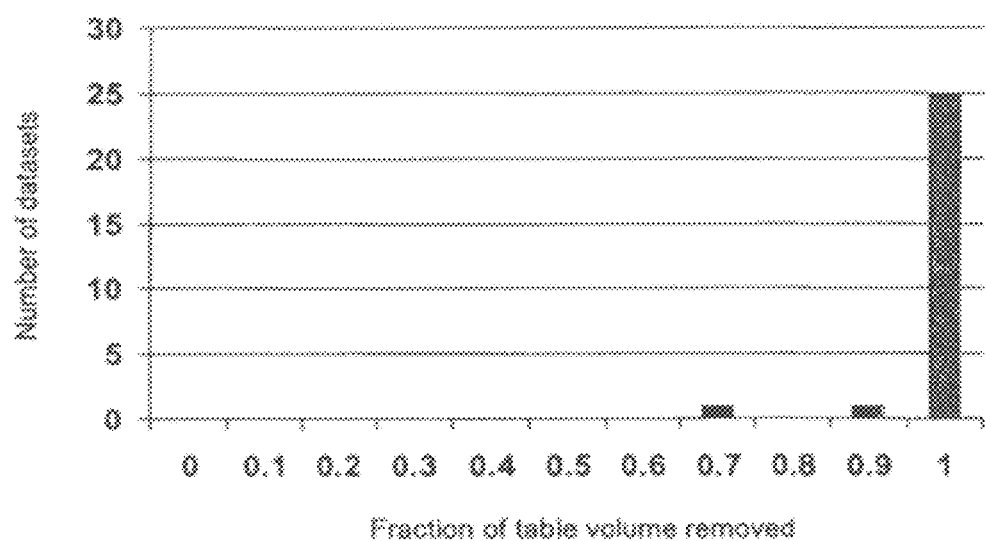
Figure 8:

FIGS. 5a to 5c illustrate results obtained by applying the method of FIGS. 2 to 27 separate CT measurement data sets. Each CT measurement data set includes data representative both of a patient and a table. FIG. 5a is a bar graph showing the fraction of the patient's body that was correctly identified by the process for the 27 different data sets. It can be seen that 100% of the patient's body was correctly identified for 26 of the 27 data sets and that 99% of the patient's body was correctly identified for the other one of the 27 data sets.

FIG. 5b is a bar graph showing the fraction of the table that was falsely identified by the process as belonging to the patient region for the 27 different data sets. It can be seen that for 16 of the data sets, none of the table was falsely identified. For six of the data sets 5% of the table was falsely identified as belonging to the patient region, for three of the data sets 10% of the table was falsely identified, for one of the data sets 20% of the tables was falsely identified and for one of the data sets 40% of the table was falsely identified as belonging to the patient region.

FIG. 5c is a bar graph showing the fraction of the table removed by the process of FIG. 2 for each of the 27 data sets. It can be seen that for 25 of the 27 data sets 100% of the table volume was successfully removed, for one of the data sets 90% of the table volume was successfully removed, and for one of the data sets 70% of the table volume was successfully removed.

FIG. 6 is a 3-D representation of data from one of the data sets of FIGS. 5a to 5c, in which the identified body region and the identified table region are shown using different colours or shadings.

Figure 7A:
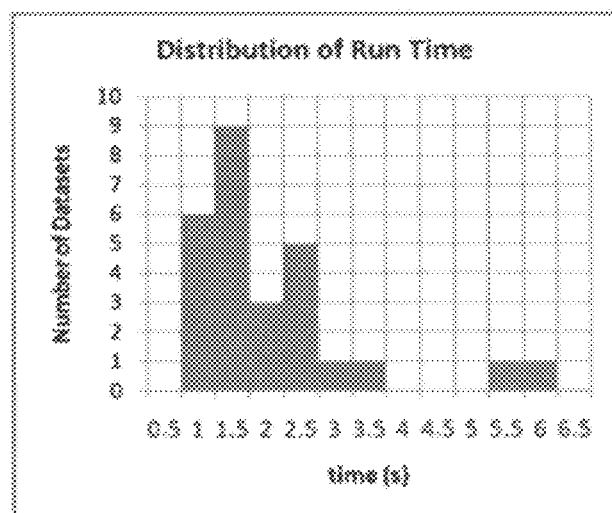
FIGS. 7a and 7b are graphs illustrating the performance of the processing apparatus of FIG. 1 when performing the process on the data sets of FIGS. 5a to 5c.
Figure 7B:
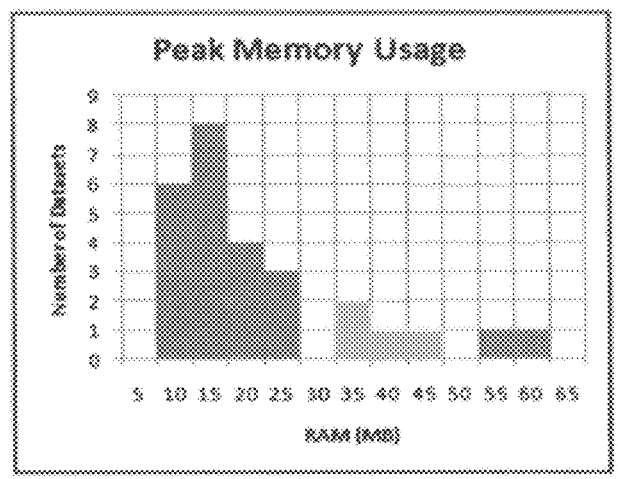

FIGS. 7a and 7b are graphs illustrating the performance of the processing apparatus 2 when performing the processing of the data sets of FIGS. 5a to 5c.

FIG. 7a is a bar graph showing the runtime required to perform the process for the different data sets. It can be seen that the runtime varies between 1 second and 6 seconds, and that a runtime of 1.5 seconds was obtained for nine of the data sets.

FIG. 7b is a bar graph showing the amount of RAM needed to perform the process for the different data sets of FIGS. 5a to 5c. It can be seen that the amount of RAM needed varied between 10 MB and 60 MB, and that 8 MB was needed in the case of 15 of the data sets.

The process of FIG. 2 has been described as being directed to the processing of CT image data sets. However the method is not limited to the processing of CT image data sets and can be used to process any suitable image data set. For example any suitable volumetric medical imaging data can be processed using the method to identify and extract image data representative of a patient or other subject. For instance, MRI data can be processed using the method. In the case of MRI data an initial calibration or scaling of the voxel values may be needed before performing the initial thresholding.

It will be well understood by persons of ordinary skill in the art that whilst embodiments implement certain functionality by means of software, that functionality could be implemented solely in hardware (for example by means of one or more ASICs (application specific integrated circuit)) or by a mix of hardware and software. As such, embodiments are not limited only to being implemented in software.

Whilst particular modules have been described herein, in alternative embodiments functionality of one or more of those modules can be provided by a single module or other component, or functionality provided by a single module can be provided by two or more modules or other components in combination.

While certain embodiments have been described, these embodiments have been presented by way of example only, and are not intended to limit the scope of the inventions. Indeed the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms and modifications as would fall within the scope of the invention.

The invention claimed is:

1. A method of selecting image data representative of a subject from an image data set, the image data set corresponding to the subject and a structure except the subject, comprising
    dividing image data into a plurality of regions;
    identifying from amongst the plurality of regions at least one region that is representative of a predetermined region based on a value of a geometrical classifier, the geometrical classifier distinguishing between parts of the subject and parts of the structure and being a function of a shape of said at least one region;
    excluding data representative of the identified at least one region that is representative of the predetermined region;
    determining first regions and second regions from the plurality of the regions, the first regions being representative of parts of the subject and the second regions corresponding to candidates of parts of the structure;
    selecting at least one region, from the second regions corresponding to said candidates of said parts of the structure except the subject; and
    connecting the selected at least one region, selected from the second regions, to the first regions to define said image data representative of the subject.

2. A method according to claim 1, comprising selecting a region of maximum size as being representative of the subject.

3. A method according to claim 1, comprising comparing the size of each region to a threshold, wherein the selecting of the at least one region as being representative of the subject comprises selecting the at least one region based upon the comparison.

4. A method according to claim 3, wherein the size of a region is the relative size of the region compared to the total size of all of the regions.

5. A method according to claim 1, comprising identifying from amongst any other of the regions at least one region that is representative of an extraneous feature; and
excluding data representative of the identified at least one region that is representative of the extraneous feature.

6. A method according to claim 5, wherein the identification from amongst the other of the regions of at least one region that is representative of the extraneous feature is based upon at least one of the size and shape of the region.

7. A method according to claim 5, comprising determining the value of a geometrical classifier for each region, and identifying the at least one region that is representative of the extraneous feature based upon the determined values of the geometrical classifier.

8. A method according to claim 7, comprising comparing the determined value of the geometrical classifier of a region to a threshold, and identifying a region as being representative of an extraneous feature in dependence on the comparison.

9. A method according to claim 7, wherein the value of the geometrical classifier for a region is a function of the perimeter of a slice through the region and of the cross-sectional area of the slice through the region.

10. A method according to claim 7, wherein the value of the geometrical classifier of a region is a function of surface area of the region and of the volume of the region.

11. A method according to claim 1, comprising performing a morphological operation.

12. A method according to claim 11, wherein the morphological operation comprises separating regions that are connected by a connecting region that is below a threshold thickness.

13. A method according to claim 11, wherein the morphological operation comprises applying a morphological opening procedure.

14. A method according to claim 11, comprising identifying from amongst any other of the regions remaining after removal of the at least one region representative of the extraneous feature, any regions that, before the morphological process, were connected to the region that is selected as representing the subject, and adding those connected regions to the region selected as representing the subject.

15. A method according to claim 1, wherein the identification of the regions of image data comprises using a connected component analysis technique to determine the regions.

16. A method according to claim 1, wherein the data set comprises a plurality of voxels, the method comprises comparing a property of each voxel to a threshold and selecting a plurality of voxels in dependence on the comparison, and the selection of at least one region is a selection of at least one region from amongst the selected voxels.

17. A method according to claim 16, wherein the property comprises an intensity.

18. A method according to claim 17, wherein the threshold is an intensity threshold that is between 200 Hounsfield Units and 600 Hounsfield Units.

19. A method according to claim 16, wherein the selecting of the plurality of voxels identifies voxels that are representative of liquid or solid material and excludes voxels that are substantially wholly representative of gas.

20. A method according to claim 1, comprising fitting a shape to the region selected as representing the subject, and selecting all voxels within the fitted shape.

21. A method according to claim 20, wherein the fitting is subject to the constraint that the shape is convex.

22. A method according to claim 1, wherein the image data set comprises a volumetric medical imaging data set.

23. A method according to claim 1, wherein the subject comprises at least part of a human or animal body.

24. A method according to claim 5, wherein the extraneous feature comprises a table.

25. A method according to claim 1, wherein the subject comprises a table.

26. Apparatus for selecting image data representative of a subject from an image data set, the image data set corresponding to the subject and a structure except the subject, comprising:
processor comprising circuitry and programing configured to
divide the image data into a plurality of regions;
identify from amongst the plurality of regions at least one region that is representative of a predetermined region based on a value of a geometrical classifier, the geometrical classifier distinguishing between parts of the subject and parts of the structure and being a function of a shape of said at least one region;
exclude data representative of the identified at least one region that is representative of the predetermined region;
determine first regions and second regions from the plurality of the regions, the first regions being representative of parts of the subject and the second regions corresponding to candidates of parts of the structure,
select at least one region, from the second regions corresponding to said candidates of said parts of the structure except the subject, and
connect the selected at least one region, selected from the second regions, to the first regions to define said image data representative of the subject.

27. Apparatus according to claim 26, wherein processor is configured to identify from amongst any other of the regions at least one region that is representative of an extraneous feature; and remove from the data set data representative of the identified at least one region that is representative of the extraneous feature.

28. Apparatus according to claim 26, wherein the identification from amongst the other of the regions of at least one region that is representative of the extraneous feature is based upon at least one of the size and shape of the region.

29. Apparatus according to claim 26, wherein the processor is configured to determine the value of the geometrical classifier for each region, and to identify the at least one region that is representative of the extraneous feature based upon the determined values of the geometrical classifier.

30. Apparatus according to claim 26, wherein the processor is configured to perform a morphological operation.

31. Apparatus according to claim 30, wherein the morphological operation comprises applying a morphological opening procedure.

32. Apparatus according to claim 30, wherein the processor is configured to identify from amongst any other of the regions remaining after removal of the at least one region representative of the extraneous feature, any regions that, before the morphological process, were connected to the region that is selected as representing the subject, and adding those connected regions to the region selected as representing the subject.

33. Apparatus according to claim 26, wherein the data set comprises a plurality of voxels, the processor is configured to compare a property of each voxel to a threshold and to select a plurality of voxels in dependence on the comparison, and the selection of at least one region is a selection of at least one region from amongst the selected voxels.

34. Apparatus according to claim 33, wherein the property comprises an intensity.

35. Apparatus according to claim 34, wherein the threshold is an intensity threshold that is between 200 Hounsfield Units and 600 Hounsfield Units.

36. Apparatus according to claim 26, wherein the processor is configured to fit a shape to the region selected as representing the subject, and to select all voxels within the fitted shape.

37. Apparatus according to claim 36, wherein the fitting is subject to the constraint that the shape is concave.

38. Apparatus according to claim 36, wherein the fitting is subject to the constraint that the shape comprises substantially no convex part.

39. A non-transitory computer readable medium, encoded with computer readable instructions, which when executed cause a computer-to perform the method according to claim 1.

\* \* \* \* \*